United States Patent [19]

Cedar et al.

[11] Patent Number: 5,347,641
[45] Date of Patent: Sep. 13, 1994

[54] PAGE REGISTER WITH A DON'T CARE FUNCTION

[75] Inventors: Yoram Cedar, Cupertino; Arye Ziklik, Sunnyvale; Alex Shubat, Fremont, all of Calif.

[73] Assignee: WaferScale Integration, Inc., Fremont, Calif.

[21] Appl. No.: 752,380

[22] Filed: Aug. 30, 1991

[51] Int. Cl.⁵ .............................................. G06F 12/02
[52] U.S. Cl. ................................. 395/400; 395/425;
  364/DIG. 1; 364/DIG. 2; 364/245.31;
  364/251.5
[58] Field of Search ... 364/200 MS File, 900 MS File;
  395/400, 425

[56] References Cited

U.S. PATENT DOCUMENTS

| | | | |
|---|---|---|---|
| 4,453,212 | 6/1984 | Gaither et al. | 395/400 |
| 4,658,350 | 4/1987 | Eggebrecht et al. | 395/425 |
| 4,918,598 | 4/1990 | Ashkin et al. | 395/275 |
| 4,999,805 | 3/1991 | Culley et al. | 395/325 |
| 5,047,989 | 9/1991 | Canepa et al. | 365/238.5 |
| 5,101,339 | 3/1992 | Fairman et al. | 395/400 |
| 5,274,767 | 12/1993 | Maskovyak | 395/275 |

*Primary Examiner*—Joseph L. Dixon
*Assistant Examiner*—Hiep T. Nguyen
*Attorney, Agent, or Firm*—Skjerven, Morrill, MacPherson, Franklin & Friel

[57] ABSTRACT

Page logic, which is coupled to a programmable array decoder, allows for expansion of memory address space depending on the number of bits in a page register. The programmable array decoder has a "don't care" function which allows the user to be independent of the page mode.

15 Claims, 5 Drawing Sheets

PAGE REGISTER WITH A DON'T CARE FUNCTION

FIELD OF THE INVENTION

This invention relates to page logic, and in particular to a page register connected to a programmable array as applied to a programmable system device (PSD) product.

BACKGROUND OF THE INVENTION

Microcontrollers (MCU's) are used in many applications to manage the activity and flow of operation in the system. Examples of MCU's are the 8031/8051 (Intel), 68HC11 (Motorola), and the Z8 (Zilog). In order for the MCU to be able to control the system, the user has to connect memories, i.e. electrically programmable read only memories (EPROMs) or static random access memories (SRAMs), Input/Output peripherals (I/O Ports, Timers, Serial peripherals, LED drivers, etc. ) as required by the application. Usually, EPROMs store the application program and SRAMs store the data. The MOU executes the program by fetching instructions from the EPROM and manipulating the data in the SRAM. In addition, the MCU has to control the data transfer from or to the peripherals.

To perform these operations and control the data flow in the system, the MCU has three busses: address, data, and control. At any given time only one of the external devices connected to the MCU can be accessed (i.e. data written to or read from the device). Because all the external devices are connected to a single data bus, there is a need to specify which one of the devices is currently being accessed. This is done by assigning different address space to different devices. For example, an 8-bit MCU that needs to access a 32K×8 EPROM, a 8K×8 SRAM and four peripherals each requiring 2K×8 of address will need a total of 48K×8 addresses (32K+8K+4×2K). If the MCU has 16 bits of address lines (address bus), then the total available address space is 64K×8 which satisfies the requirements of this particular example. An external address decoder generates select signals to the peripherals for each address that the MCU outputs on the address lines. In this manner, the MCU controls the data flow from or to the external peripherals on a single data bus.

However, as system requirements for memory and peripheral devices grow, there is a need to access a larger address space than is available by the MCU. Most controllers do not have more than 16 address lines which limit their address space to 64K. In the above example if the EPROM density is 128K×8, then the total required address space is 144K which exceeds the capabilities of the MCU.

To overcome this problem, a page register is typically introduced into the system. The page register can be loaded directly from the data bus while the output lines are used as additional address lines. For example, a 4-bit page register in a 16 address line MCU adds 4 address lines resulting in a total of 20 equivalent address lines. This register extends the address capability of the MCU from the 64 K to the 1 M address range. In effect, the MCU has 16 pages of 64 K core addresses of the MCU. The MCU programmer loads new values into the page register each time an interpage access is required. To facilitate this loading, the page register has an address assigned to it in the MCU address space. This specific address must be independent of the page currently being used in order for the program to move between the pages. Other peripherals in the system may have addresses that appear only in a specific page.

In addition, the system must read the page value from the page register into the MCU. This feature is especially important when an interrupt occurs which requires transfer of program execution to the interrupt service routine. After the interrupt is serviced, the program restores execution of the interrupted program by loading the previous value into the page register. Because interrupts can occur at any time, the interrupt service routine also has to be independent of the current accessed page.

For example, in U.S. Pat. No. 4,685,084 a product is disclosed which permits a read-only memory (ROM) to be programmed to operate in one of two addressing modes. In one mode, the memory operates as an ordinary ROM. In the alternate mode, not all of the address lines are used, thereby freeing address space to access other devices. In this product, an EPROM having a 64 K×8 memory configuration can appear as one block or can be segmented into four blocks of 16K×8 memory configuration. However, external logic for decoding is needed to take advantage of the freed address space. This external logic contributes to the expense and size of the product. Additionally, the product necessitates continuously programming between the two modes of operation. This programming is time-consuming and inconvenient for the user. In addition, the page mode selection is dependent upon the actual page the user is in. Finally, the location of the actual current page during interrupt cannot be read into the MCU.

Therefore, a need arises for a page register that increases the address capability of the MCU without external logic while ensuring that the location of the page register is independent of the actual page the user is in.

SUMMARY OF THE INVENTION

A structure in an integrated circuit relating to page logic in a programmable system decoder (PSD) is provided. In accordance with the invention, a "don't care" function is provided in a programmable array decoder (PAD) connected to a page register which permits the user to effectively locate required devices independent of the page he is in. The page register sets the page and the PAD sends select/deselect signals to memories, peripherals, and inputs/output ports (I/O's) both internal and external to the system.

DETAILED DESCRIPTION

A programmable system device (PSD) typically includes memory storage elements, i.e. EPROMs and SRAMs, I/O's, and a programmable array decoder (PAD). The PAD is used to decode address space for both on-chip functions (for example, accessing EPROMs, SRAMs, or I/O's) and for external peripherals (described in detail later). In accordance with the present invention, a page register is connected to the PAD with a "don't care" function. The page register address location is specified by the PAD in the PSD. Hence, the location of the page register, or any other required device, is independent of the page the user is in. Using this configuration, external devices may also utilize the page mode. Furthermore, stored values in the page register can be read into the MCU at specified times, for example after an interrupt.

As described below in further detail, the present invention eliminates some of the problems identified in the prior art, and increases the efficiency and versatility of a PSD.

Figure 1:
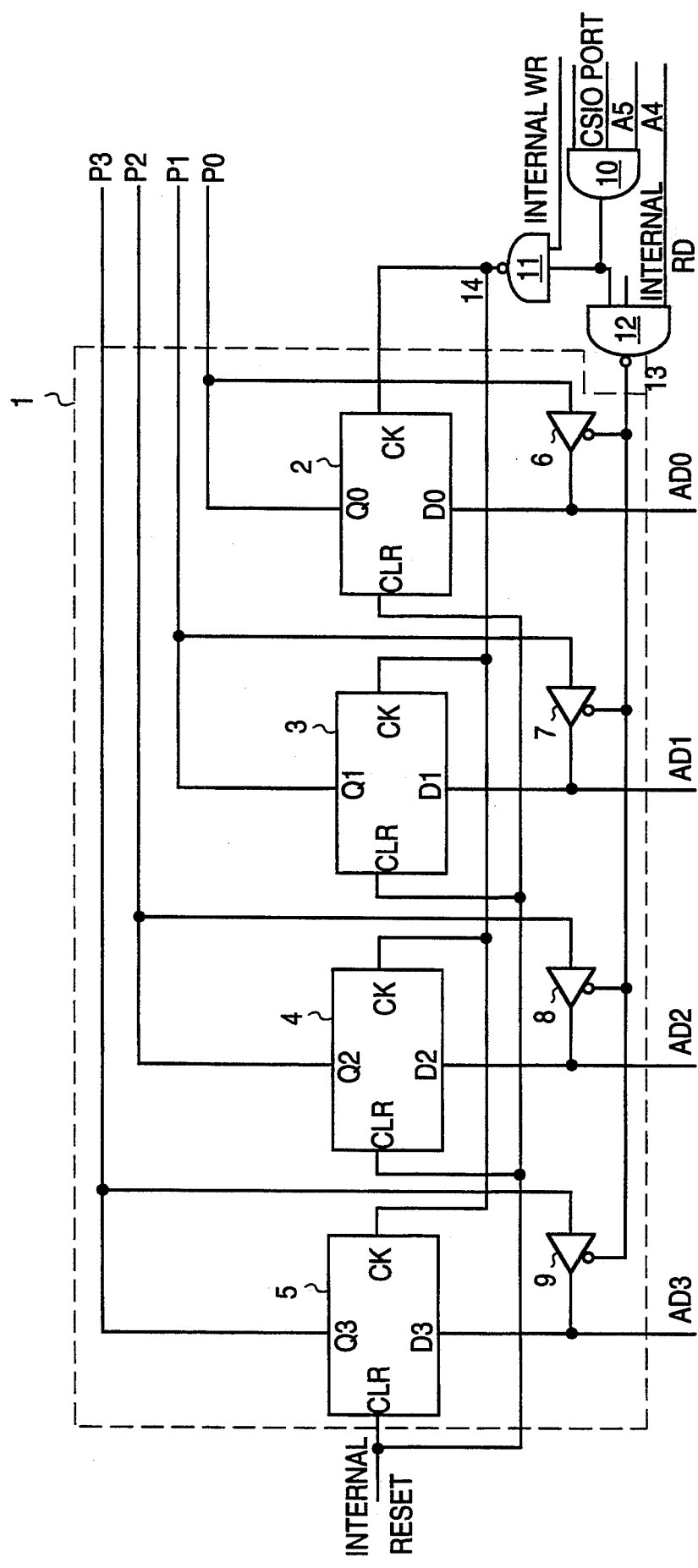
FIG. 1 illustrates a schematic of one embodiment of a page register in accordance with present invention consisting of four (4) flip-flops which increase address space up to sixteen (16) pages.

As shown in FIG. 1, an illustrative page logic 1 includes a page register, i.e. flip-flops 2–5, and tri-state buffers 6–9. In this embodiment of the invention, flip-flops 2–5 are negative edge-triggered D flip-flops which sample their data inputs D0–D3 and change their outputs Q0–Q3 only at the falling edge of a controlling clock signal CK on line 14. Address/data lines AD0–AD3, part of a bus (not shown), are connected to flip-flops 2–5, respectively.

Figure 2:
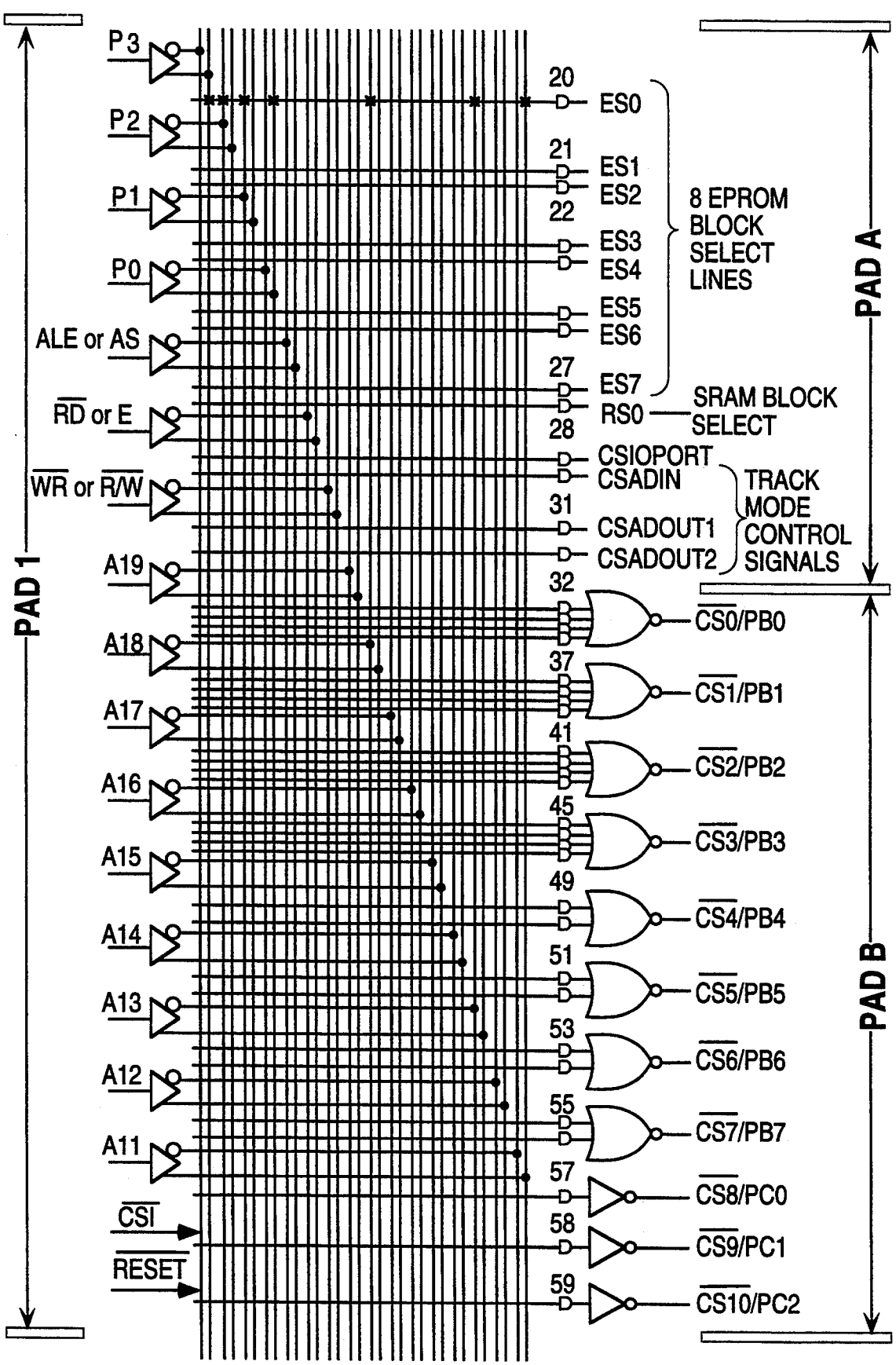
FIG. 2 shows page register output lines P0-P3 connected to a programmable array decoder (PAD) 1 which programmably selects pre-determined memory blocks, peripherals, and I/O's.

Page register outputs Q0–Q3 are transferred via lines P0–P3 into a programmable address decoder (PAD) 1, as seen in FIG. 2. When the tri-state buffers 6–9 are enabled, a path is established between address/data lines AD0–AD3 and lines P0–P3, respectively. This feature is utilized in a read mode which is explained in further detail later. A tri-state buffer needs an active high inside the buffer to be enabled. Therefore, a low-signal on line 13, inverted by each of the buffers, provides enablement of tri-state buffers 6–9. If tri-state buffers 6–9 are not enabled, only data on lines AD0–AD3 appear as inputs D0–D3, respectively.

Other input lines connected to PAD 1, i.e. A11–A19, indicated on FIG. 2 are address lines that come directly from the microcontroller. PAD 1 includes PADs A and B. PAD B is distinguished from PAD A only by its output lines. Signals on output lines from PAD B, i.e. CS0/PB0–CS10/PC2, enable external devices, whereas signals on output lines from PAD A, i.e. ES0–ES7, enable internal devices.

Figure 3:
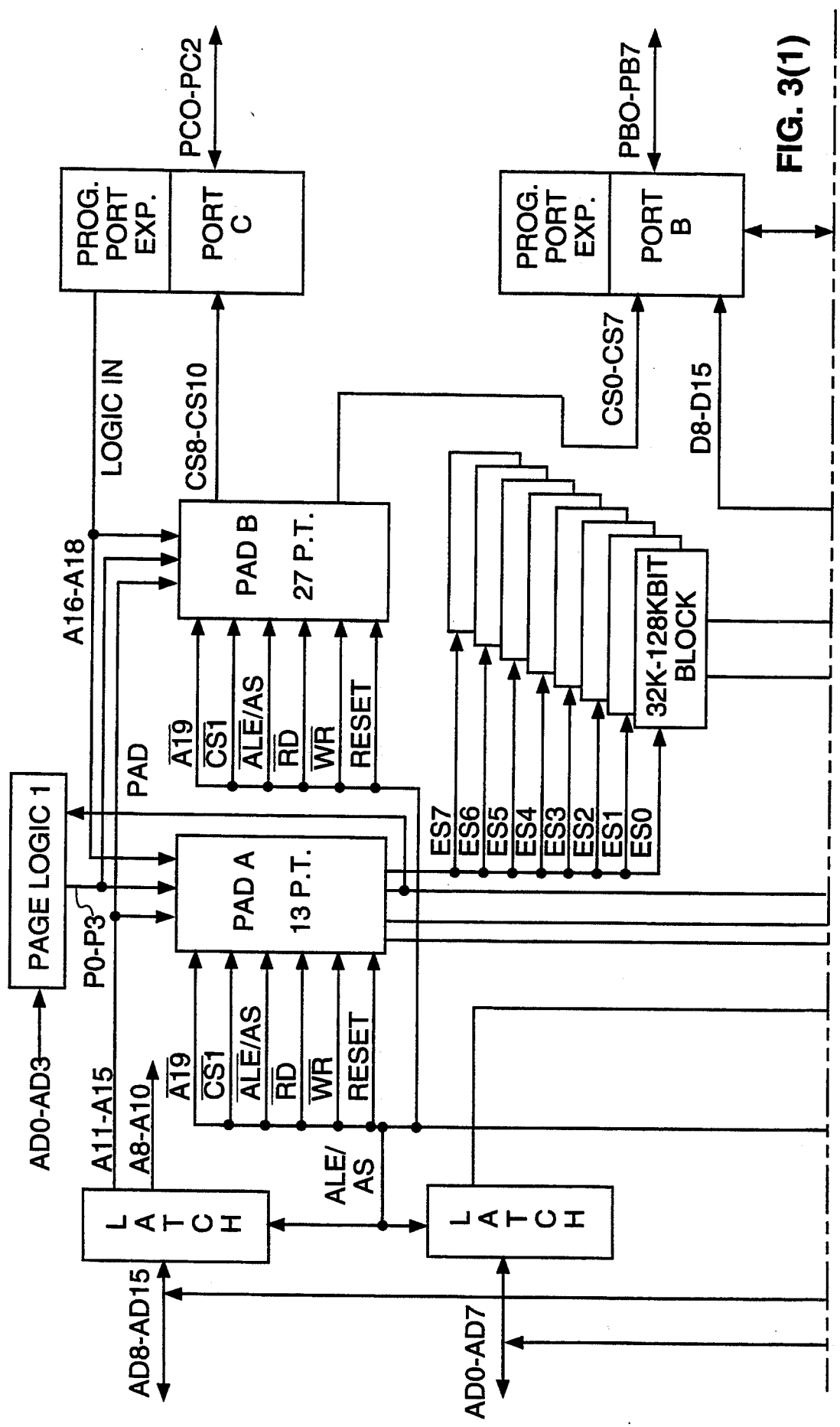
FIG. 3(1)-3(2) illustrates one schematic of architecture which includes page logic.
Figure 3:
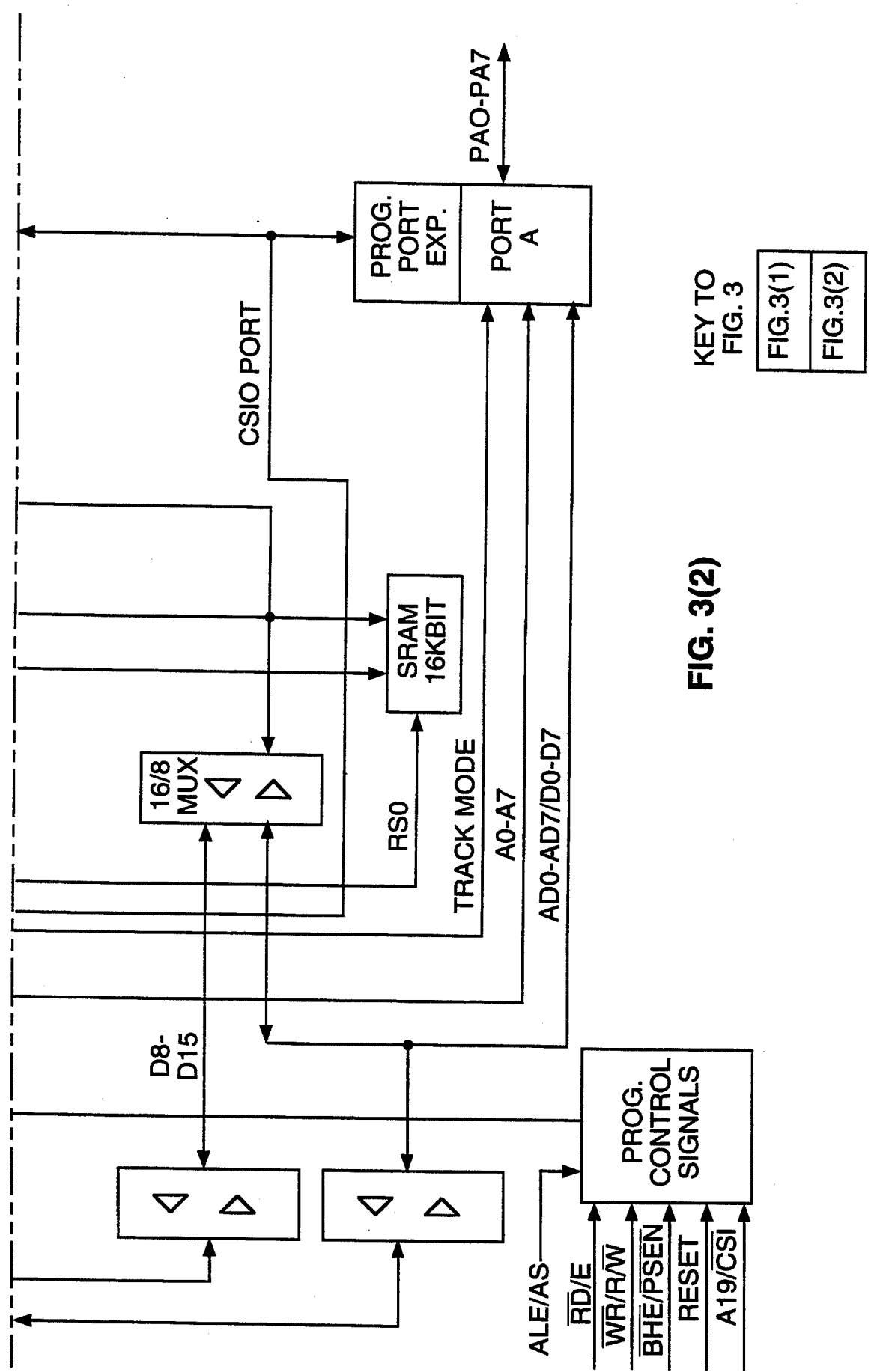

FIGS. 3(1)–3(2) shows in block diagram form one possible PSD product layout which includes page logic 1. PAD A and PAD B are connected to illustrative internal and external devices, respectively. For additional information regarding the operation of an illustrative system in which a page register with a "don't care" function in accordance with the present invention is used, reference is made to the "Programmable System Device PSD302 User's Manual," copyrighted 1991, available from WaferScale Integration, Inc., Fremont, California, which is hereby incorporated by reference in its entirety.

The user programs PAD 1 to select internal devices, i.e. particular EPROMs in this embodiment, by electrically coupling AND gates 20–59 to predetermined address lines A11–A19 and input lines P0–P3. The input leads of AND gates 20–59 can be programmably connected to receive signals on lines A11–A19 and lines P0–P3 or the logical inverse of these signals. In the notation of FIG. 2, AND gate 20 is coupled (shown by crosses) to generate the logical product of a number of signals including A11, A13, A18, P0, P1, P2, and P3, PAD A output line ES0 carries the resulting signal that subsequently determines which EPROM is selected. In this embodiment, PAD A also enables the user to access other memories, i.e. a static random access memory (SRAM) via line RS0, chip select outputs via lines CSADIN, CSADOUT 1, and CSADOUT 2, and an I/O port via line CSIOPORT. PAD B can implement up to four (4) sum-of-product expressions based on address input lines and control signals. Pad B could be used to access external devices thus using the internal decoding (paging) to enable external peripherals.

In the page register shown in FIG. 1, four output signals, Q0–Q3, provide PAD 1 with 16 different combinations. Therefore, in this embodiment, the original address space can be expanded up to 16 pages. In other words, if addresses on lines A17–A19 as seen in FIG. 2 normally access one meg of address space, a page register with four bits allows for access of sixteen (16) meg of memory.

As seen in FIG. 1, if the signal on line CSIOPORT is low, then the output signals on lines 13 and 14 from NAND gates 11 and 12 are high, thereby disabling tri-state buffers 6–9 and preventing data from latching into flip-flops 2–5 (signal CK is high). Note that the resulting state is unaffected by the values on lines INTERNAL WR, A4, A5, and INTERNAL RD. Page logic 1 is normally in this storage state.

Page logic 1 can be written to or read when the signals on lines CSIOPORT, A4, and A5 are high. In the write mode, the signal on line INTERNAL WR is high, whereas the signal on line INTERNAL RD is low. These signals propagated through AND gate 10 and NAND gates 11 and 12 provide a high signal on line 13 and a low signal on line 14. A high signal on line 13 renders tri-state buffers 6–9 disabled. Therefore, as mentioned previously, the data on address/data lines AD0–AD3 appear as inputs to flip-flops 2–5. A low to high transition of the signal on line 14 allows the data inputs D0–D3 to be latched into the flip-flops 2–5 as outputs Q0–Q3, respectively. These outputs are subsequently fed into PAD 1 via lines P0–P3.

In the read mode, the signal on line INTERNAL RD is high, whereas the signal on line INTERNAL WR is low. These signals propagated through the illustrated logic enable tri-state buffers 6–9 which provide the paths between address/data lines AD0–AD3 and output lines P0–P3, respectively. Hence, the current latched data is transferred via lines P0–P3 into PAD 1.

A read mode is activated, for example, during an interrupt in the system when a higher priority function must be performed. The current latched data transferred into PAD 1 is stored until the higher priority function is completed. At that time, the stored data is retrieved. In this manner, a particular page may be returned to after the interrupt is complete.

Figure 4:
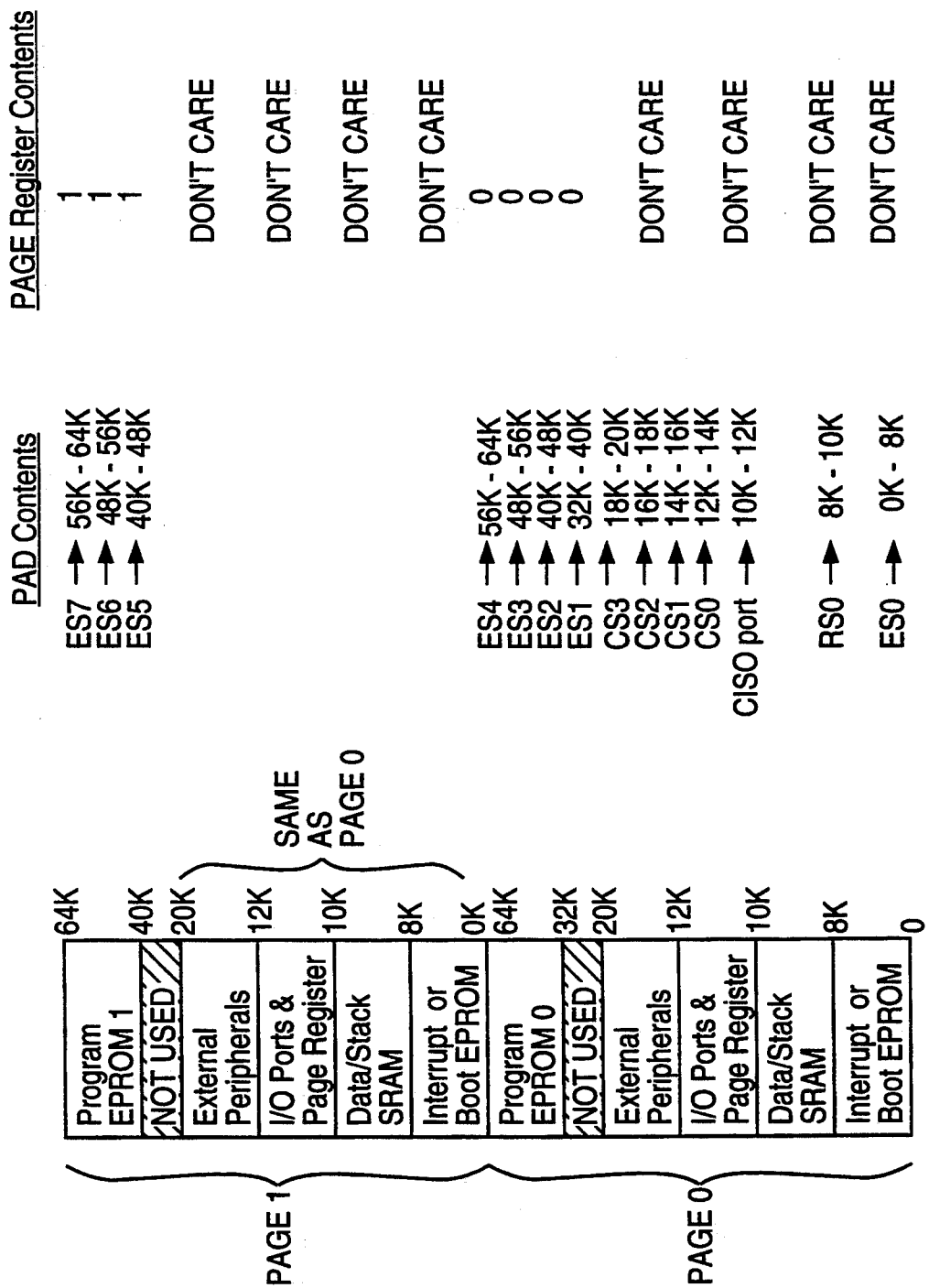
FIG. 4 illustrates one embodiment of how the "don't care" function operates in the present invention.

In accordance with the present invention, PAD 1 provides the user with a "don't care" function that facilitates independence from the page mode. Referring to FIG. 2, if input lines P0–P3 are not programmed, i.e. not connected, to a particular set of address input signals on lines A11–A19, then regardless of what page the user is in currently, the user can access a particular device with the same address input signals. In other words, a certain portion of each page is reserved for accessing a particular device. FIG. 4 illustrates one embodiment of how the "don't care" function operates in the present invention.

In FIG. 4, zero to 8 k of the addressed memory is utilized in both page 0 and page 1 to interrupt or boot the EPROM, 8 to 10 k is used to access the data/stack SRAM, 10 to 12 k is reserved to access I/O ports and page register, and 12 to 20k is utilized to access external peripherals. Note that a few portions of the pages, i.e. zero to 12 k is determined by outputs from PAD A. The portions of the pages from 12 k to 20 k are determined by signals on output lines from PAD B. The remaining portions of the memory in pages 0 and 1 are used to select EPROM 0 and EPROM 1, respectively, and are determined by signals on output lines from PAD A. The memory reserved from 0 to 20 k may also appear in all subsequent pages. An actual embodiment of the present invention would depend upon the number and type of devices desired to be accessed by the user. Hence, different peripherals, memories, or I/O ports may also be accessed if the user is in a different page.

The preceding description is meant to be illustrative only and not limiting. For example, negative edge-triggered D type flip-flops 2–5 in FIG. 1 may instead be positive edge-triggered; memory devices shown as EPROMS may instead be SRAMS, and vice versa; and amount of memory reserved for accessing of devices will vary as determined by the user. Those skilled in the art will be able to fabricate other devices in accordance with this invention based on the above description and the appended claims.

We claim:

1. Structure in a programmable system device for providing a page mode comprising:
    means for programmably selecting devices, said means for programmably selecting having input lines for accepting signals which indentify devices and output lines for carrying signals which enable devices;
    means for selectively latching and transferring data signals to a first plurality of said input lines, said data signals indicating said page mode; and
    means for providing address signals to a second plurality of said input lines,
    wherein one of said output lines is coupled to said means for selectively latching and transferring data and wherein said one of said output lines carries a signal which enables reading from and writing to said means for selectively latching and transferring data in response to said address signals indicating an address corresponding to said means for selectively latching and transferring data,
    whereby said means for programmably selecting provides said structure with a "don't care" function which enables reading from and writing to said means for selectively latching and transferring data, regardless of said data signals.

2. The structure of claim 1 wherein said means for programmably selecting comprises a programmable array decoder.

3. The structure of claim 2 wherein said means for selectively latching and transferring data comprises page logic.

4. The structure of claim 3 wherein said page logic comprises a page register.

5. The structure of claim 4 wherein said second plurality of lines comprise address lines.

6. The structure of claim 1 wherein said "don't care" function results from programming said means for programmably selecting devices so that when selected address signals are applied to said second plurality of input lines, said one of said output lines carries a signal enabling said means for selectively latching and transferring data, regardless of said data signals on said first plurality of said input lines.

7. The structure of claim 6 wherein said "don't care" function allows said means for selectively latching and transferring data to be selected independent of a page in said page mode.

8. The structure of claim 1, wherein:
    said means for providing address signals comprises an address port for connecting to a microcontroller;
    said structure further comprises:
        an internal device coupled to a first of said output lines of said means for programmably selecting devices; and
        a device port circuit coupled to a second of said output lines of said means for programmably selecting devices, said device port circuit being for connecting to an external device and providing address signals to said external device in response to a signal on said second output line which enables said device port circuit;
    said programmable system device comprises an integrated circuit containing said structure including said internal device and not including said external device; and
    said programmable system device permits a microcontroller to use said data signals indicating said page mode to selectably address said internal device and said external device.

9. A structure in a programmable system device for expansion of memory access and providing a page mode comprising:
    a programmable array decoder having a plurality of output lines for enabling devices and a first and a second plurality of input lines for accepting signals which identify devices;
    means for selectively latching and transferring data signals to said first plurality input lines, said data signals indicating said page mode; and
    means for providing address signals to said second plurality of input lines,
    wherein said programmable arrange decoder is programmed so that both said data signals and said address signals determine whether an enabling signal is provided for a first device and said address signals alone determine whether an enabling signal is provided for a second device,
    whereby said programmable array decoder has a "don't care" function such that said second device is selected independent of said page mode.

10. The structure of claim 9 wherein said means for selectively latching and transferring comprises a page register and a plurality of buffers.

11. The structure of claim 10, wherein said buffers provide said data signals and signals which are the logical inverse of said data signals.

12. The structure of claim 9, wherein said programmable array decoder further comprises:
    a logic circuit having an output lead coupled to one of said output lines of said programmable array decoder and input leads for coupling to array lines;
    a first set of array lines coupled to said input leads of said logic circuit; and
    a second set of array lines coupled to said first and second plurality of said input lines of said programmable array decoder, wherein said programmable array decoder is programmed by connecting selected lines in said second set to selected lines in said first set, and said programmable array decoder is programmed to have a "don't care" function by connecting lines in said first set to lines in said second set which are coupled to said second plurality of input lines.

13. The structure of claim 12, wherein said logic circuit comprises an AND gate.

14. The structure of claim 12, wherein said logic circuit further comprises:
   a plurality of AND gates, each of said AND gates having an output lead, and
   a NOR gate having input leads coupled to said output leads of said AND gates.

15. The structure of claim 9, wherein said second device comprises said means for selectively latching and transferring data.

* * * * *